United States Patent

Hopkins et al.

[15] 3,672,063
[45] June 27, 1972

[54] HEADLAMP AIMING DEVICE WITH ORIENTATION SENSING

[72] Inventors: Evan Lloyd Hopkins, 1701 West 13th Street; Ross Eugene Hopkins, 1910 Darlene Way; Evan Leon Hopkins, 1135 Oxford Drive, all of Emporia, Kans. 66801

[22] Filed: Jan. 25, 1971

[21] Appl. No.: 109,149

[52] U.S. Cl. ............................. 33/180 L, 248/263, 269/1, 269/21, 279/3
[51] Int. Cl. .................................. G01b 13/00, G01c 9/00
[58] Field of Search .............. 33/180 L, 46 H; 248/363, 362, 248/206; 279/3; 269/1, 21

[56] References Cited

UNITED STATES PATENTS

| | | | |
|---|---|---|---|
| 881,899 | 3/1908 | Chapman | 269/21 UX |
| 904,679 | 11/1908 | Bruton | 248/363 X |
| 1,729,131 | 9/1929 | Shaff | 248/262 X |
| 2,886,335 | 5/1959 | Mitchell | 279/3 |
| 2,997,914 | 8/1961 | Hopkins | 33/180 L |

*Primary Examiner*—Robert B. Hull
*Attorney*—Burns, Doane, Swecker & Mathis

[57] ABSTRACT

An elongate headlamp aiming tool including a seating surface for matingly abutting a reference surface of a vehicle headlamp with the tool positioned in a predetermined orientation. The tool may be held against the headlamp with a suction force of a magnitude capable of releasably and securely retaining the tool in that orientation. In instances of improper tool orientation, a sensing assembly cooperates with the headlamp and prevents the suction force from reaching that magnitude. A lower suction level thus produced signals the operator of the improper orientation by reason of the weight of the tool, and the operator may slide the partially supported tool across the headlamp until the correct orientation os obtained. Tool removal may be accomplished by positive fluid pressure.

20 Claims, 6 Drawing Figures

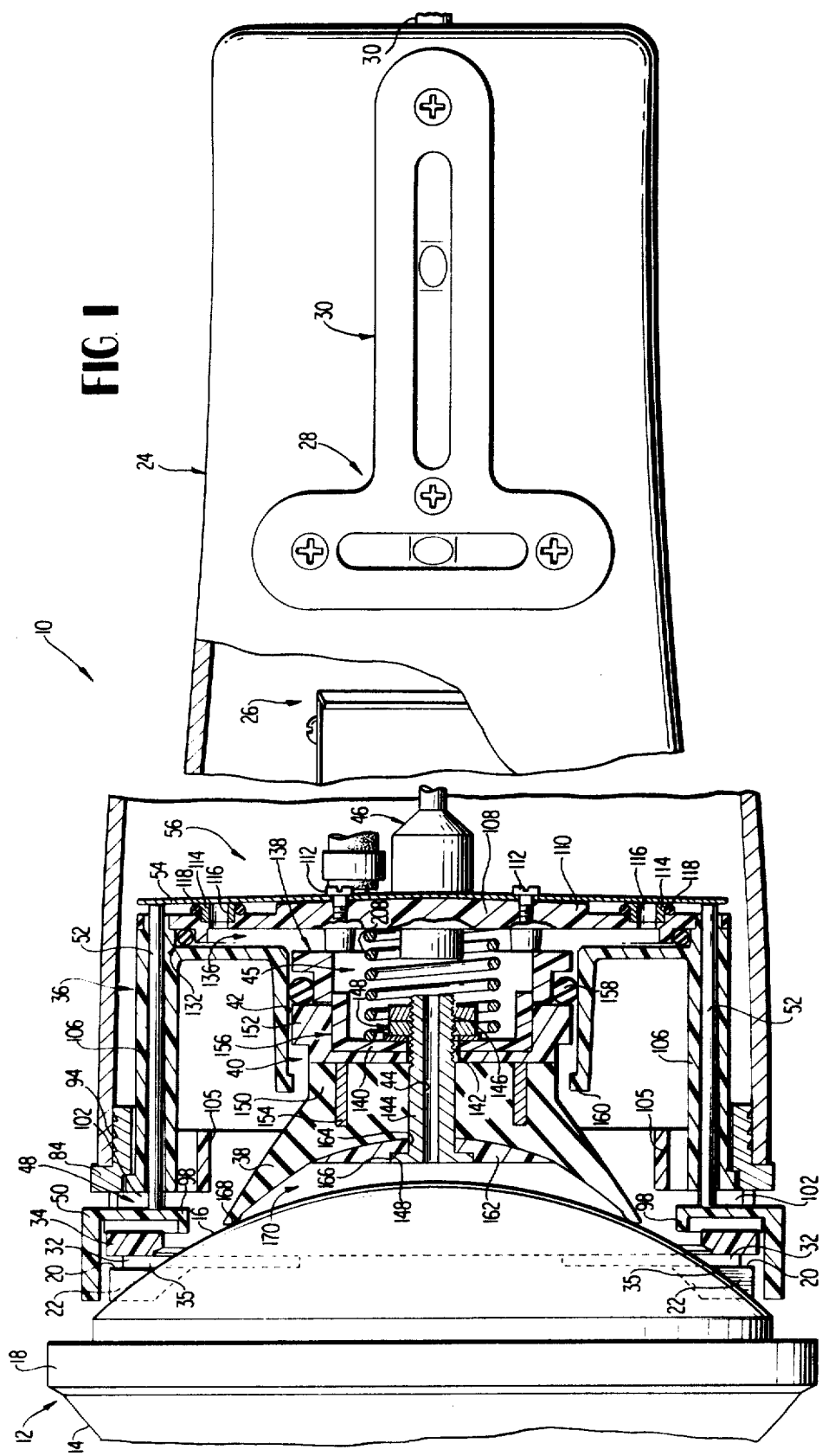

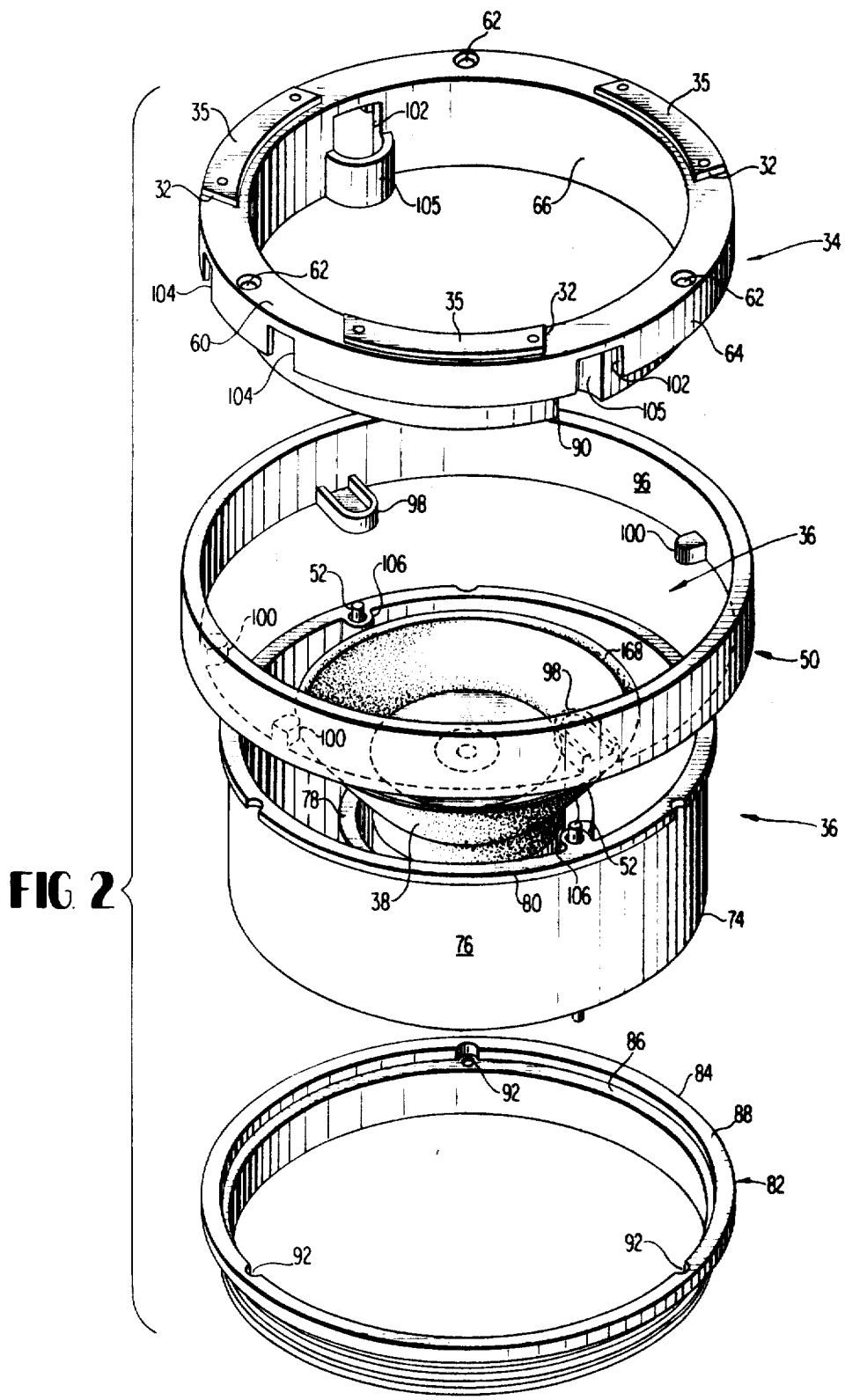

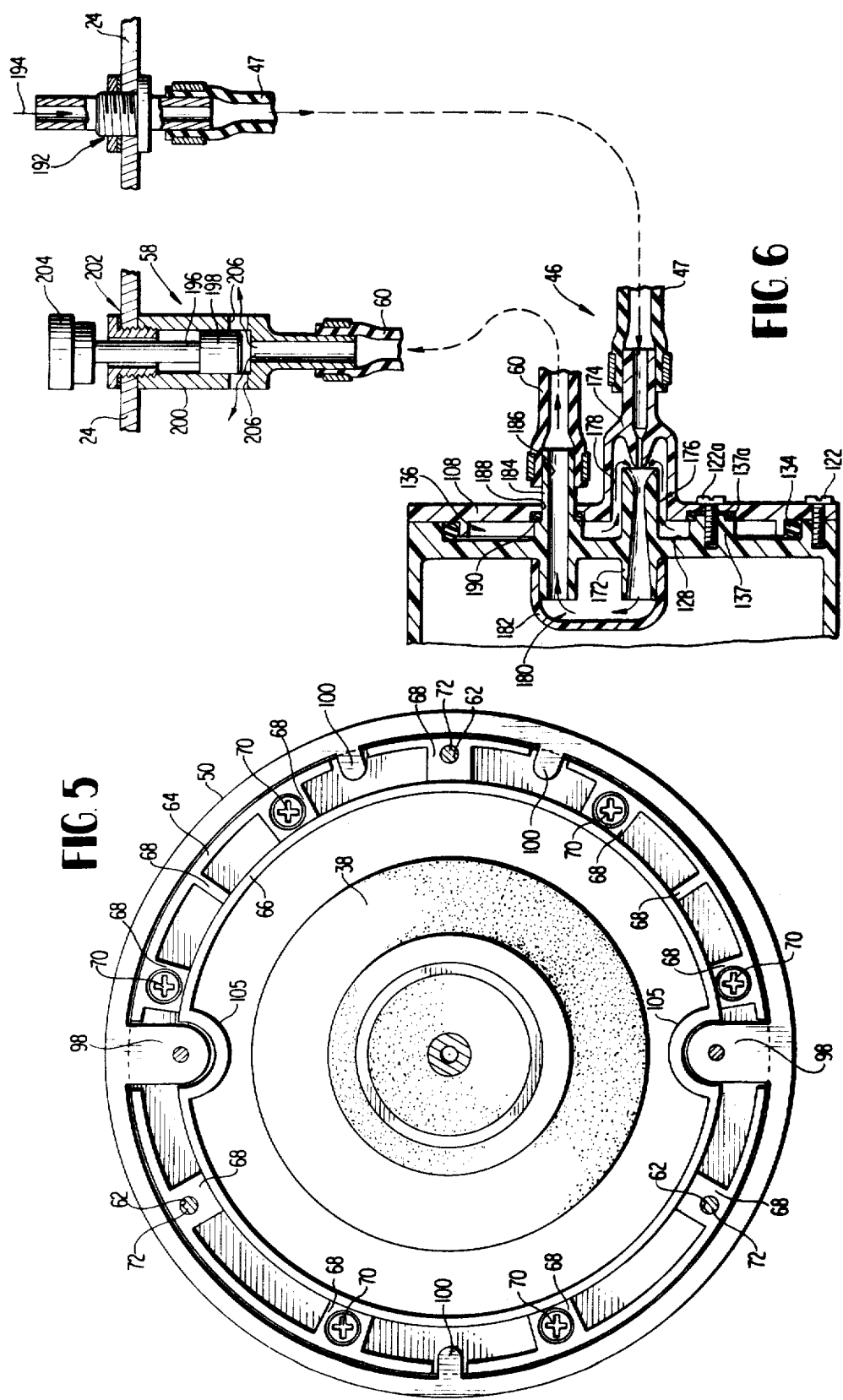

HEADLAMP AIMING DEVICE WITH ORIENTATION SENSING

BACKGROUND OF THE INVENTION

This invention relates to apparatus for testing the alignment for vehicle headlamps. More particularly this invention relates to the incorporation of sensing means in such an apparatus to insure proper orientation of the apparatus with respect to the headlamp.

Over the years, a variety of tools have been employed to test the alignment of vehicle headlamps with respect to the longitudinal axis of the vehicle in order to determine whether the beams are properly aimed. The importance of this testing procedure can be readily appreciated when the problems of visibility and glare are considered.

One such apparatus capable of a high degree of accuracy in testing headlamp alignment is disclosed in the U.S. Pat. Hopkins, No. 2,997,914, assigned to the assignee of the present invention. The device disclosed in that patent employs an aiming tool including a multiple mirror optical system which may be incorporated into the device of the present invention. During operation, the tool disclosed in the Hopkins patent is held on the headlamp through a vacuum cup assembly to which suction is applied. The tool is also provided with a seating surface corresponding to an outwardly facing reference surface of the vehicle headlamp in order to aid in the proper positioning of the tool with respect to the headlamp. When the seating surface and the reference surface are in mating engagement, the tool extends longitudinally from the headlamp in the correct alignment testing position.

Although this device is entirely acceptable from an accuracy standpoint, it has become desirable to enhance the proper orientation of a headlamp aiming tool with respect to the headlamp prior to the commencement of the alignment testing procedures. It will be recognized particularly that where a suction holding force is employed, there is a possibility that an aiming tool may be held securely in position on the headlamp without the reference surface and seating surface in proper mating engagement. This may then, of course, introduce an error into subsequent procedures.

It would therefore be desirable to provide an apparatus for testing the alignment of a vehicle headlamp with features for insuring substantially correct orientation of the tool with respect to the headlamp. In this connection, it would be particularly desirable to guard against the secure holding of the tool on the headlamp in the absence of proper mating engagement of the seating and reference surface.

It will additionally be apparent that even in instances where proper mating engagement of the seating surface and the reference surface ultimately results, it would be desirable to minimize the amount of time that an operator is required to spend in obtaining such engagement. Particularly advantageous would be the provision of some means whereby the operator would readily be able to sense a condition of proper or improper mating engagement so that further steps may be taken as required.

OBJECTS AND SUMMARY OF A PREFERRED EMBODIMENT OF THE INVENTION

With recognition of the desirability of providing the foregoing and other features in an apparatus for testing the alignment of vehicle headlamps, it is a general object of the invention to provide such an apparatus with features that will enhance the correct orientation of the tool with respect to the headlamp.

It is a particular object of the invention to provide an apparatus for testing the alignment of vehicle headlamps wherein secure holding or maintenance of the tool on the headlamp is avoided in instances where proper mating engagement of the seating and reference surfaces is lacking.

It is a further object of the present invention to provide such an apparatus wherein an operator may readily sense a condition of proper or improper mating engagement.

It is a related object of the invention to provide such an apparatus in which an improperly positioned tool may be correctly oriented with respect to the headlamp with a minimum of effort.

It is still another object of the present invention to provide such an apparatus wherein the tool is held on the headlamp through the application of a suction force to a vacuum cup.

It is yet another object of the invention to provide such an apparatus wherein the tool may be readily and positively removed from the headlamps through the application of fluid pressure.

A preferred embodiment of the invention intended to accomplish at least some of the foregoing objects comprises an apparatus for testing the alignment of vehicle headlamps, which apparatus includes an elongate headlamp aiming tool. Carried adjacent one end of the tool is means defining a seating surface for matingly abutting an outwardly facing reference surface of the vehicle headlamp when the tool is positioned in a predetermined orientation with respect to that headlamp.

Vacuum holding means, also carried by the tool, is selectively operable to produce a suction force capable of releasably and securely retaining the headlamp in that predetermined orientation. Adjacent the end of the tool proximate to the headlamp, sensing means is provided. This sensing means is cooperable with the headlamp for sensing the orientation of the tool with respect to the headlamp, and for preventing suction force from securely retaining the tool on the headlamp when the tool is improperly oriented.

In such instances, the sensing means causes the force exerted by the vacuum holding means to be reduced. Preferably, this reduced force is sufficiently great so as to be capable of partially and movably supporting the tool on the headlamp. An operator is then able to slide the tool across the face of the lamp until the sensing means properly positions about the headlamp reference surface to permit an increase in the holding force by reason of proper orientation of the tool.

Tool releasing means operatively coupled to the vacuum holding means is operable to selectively force the tool from the headlamp in a positive fashion.

The vacuum holding means may advantageously comprise a vacuum cup having a concave surface, the periphery of which is engageable with the headlamp to define a chamber between the vacuum cup and the headlamp. A passageway extends through the vacuum cup and communicates with that chamber and a source of suction. A suction reducing zone normally isolated from that suction source may also be provided. In this fashion, with the sensing means comprised of movable tool orientation detecting means and valve means responsive to movement of the tool orientation detecting means, improper orientation of the tool produces movement of the detecting means that induces responsive movement of the valve means and results in the provision of communication between the suction source and the suction reducing zone.

The suction source may include a venturi assembly that is also operative to cooperate in the provision of a positive force for removing the tool from the headlamp upon prevention of air withdrawal from a vacuum chamber communicating with the passageway extending through the vacuum cup.

Other objects and advantages of the present invention, particularly the applicability of certain features of the present invention to other than headlamp alignment testing devices, will become apparent from the subsequent detailed description of a preferred embodiment of the invention with reference to the accompanying drawings in which:

THE DRAWINGS

FIG. 1 is a plan view, in partial cross-section and partially broken away, illustrating an apparatus for testing the alignment of vehicle headlamps according to the present invention, with the apparatus securely held on the vehicle headlamp;

FIG. 2 is an exploded assembly view of the vacuum holding means and sensing means of the apparatus of FIG. 1;

Figure 4:
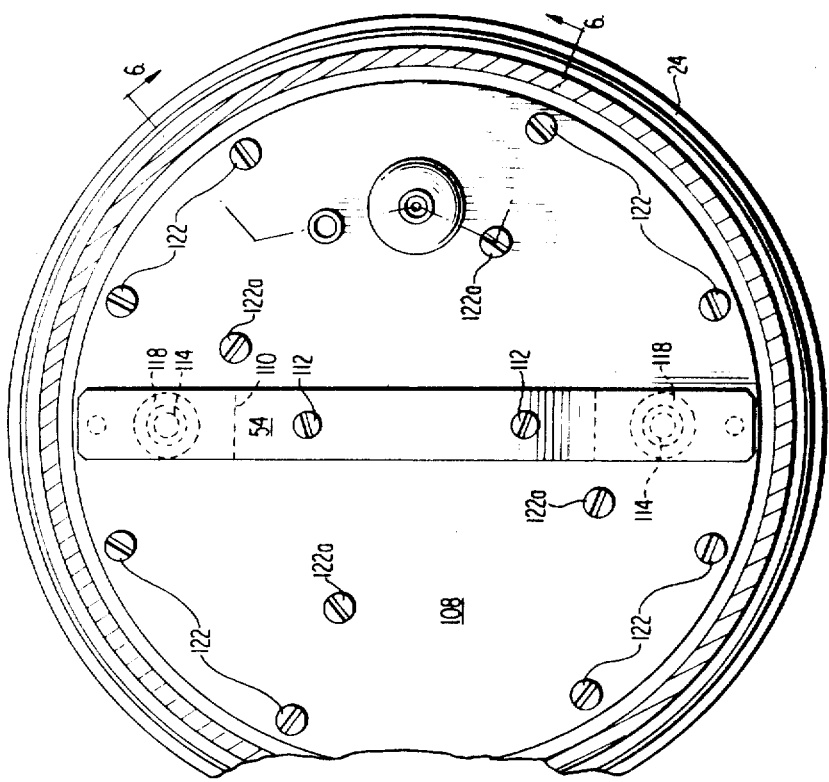
Figure 3:
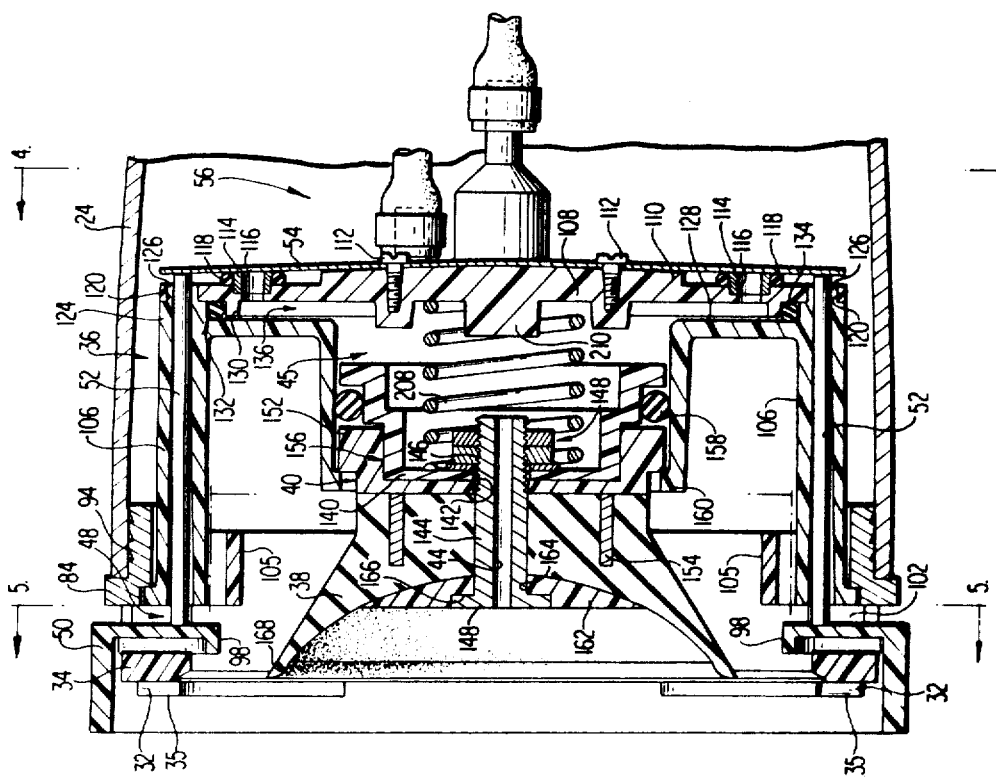
FIG. 3 is a cross-sectional view of the vacuum holding means and sensing means incorporated in the apparatus of FIG. 1 and showing the piston and vacuum cup assembly in an extended position.

FIGS. 4 and 5 are cross-sectional elevational views taken respectively along lines 4—4 and 5—5 of FIG. 3; and FIG. 6 is a cross-sectional view taken along line 6—6 of FIG. 4 in conjunction with an illustration of fluid connections to the venturi assembly of the apparatus.

DETAILED DESCRIPTION

General Summary

With reference to FIG. 1, features of a preferred apparatus for testing the alignment of vehicle headlamps according to the present invention may be understood.

In FIG. 1, the apparatus is generally designated by the reference numeral 10 and is shown securely mounted on a vehicle headlamp 12. The illustrated headlamp 12 is generally of the type shown in the previously identified Hopkins patent and is provided with a base 14 that may be cup shaped, a lens 16 and a lens retaining ring 18.

The lens 16 is provided with means defining an outwardly facing reference surface. Generally this reference surface will be discontinuous and will take the form of smooth surfaces 20 on a plurality of aiming pads 22 provided on the headlamp. The aiming pads 22 are usually three in number, integral with the lens and circumferentially spaced at 60° intervals. The smooth reference surfaces 20 of the pads 22 are generally coplanar, and together they define the outwardly facing reference surface of the headlamp.

The headlamp aiming tool 10 is generally elongate and includes an elongate body assembly 24 which may contain a multiple mirror optical system, schematically indicated in part at 26. This optical system may be of the type disclosed in the aforementioned Hopkins patent. Vertical and cross bubble assemblies, respectively designated as 28 and 30, may be securely mounted on the body assembly 24 in any suitable manner. The mirror assembly and the bubble assemblies form no part of the present invention in and of themselves, and although preferred, they may be replaced by or utilized in addition to other alignment testing equipment. The general alignment procedures that may be followed utilizing the tool 10 of the present invention are disclosed in the aforementioned Hopkins patent, the disclosure of which is hereby incorporated by reference.

Adjacent the end of the tool 10 remote from the headlamp 12 a suitable carrying handle indicated at 30 may be provided. This handle 30 may be securely fastened to the body assembly 24 in any suitable manner.

At the other end of the tool 10 and securely fastened to the body assembly 24 in a manner hereinafter more fully described, the tool is provided with means defining a seating surface. This seating surface functions to matingly abut the reference surface of the vehicle headlamp when the tool is positioned in a predetermined orientation with respect to the headlamp; e.g., the orientation shown in FIG. 1 where the tool 10 and headlamp 12 are axially aligned.

As in the case of the reference surface, the seating surface may be discontinuous in nature. In the preferred embodiment the seating surface is formed by a plurality of metallic inserts 32 mounted on an adapter ring 34. The metallic inserts 32 each have smooth and coplanar outwardly facing surfaces 35 for abutting the surfaces 20 of the aiming pads 22.

The tool is held in its properly oriented position with the seating surface matingly abutting the reference surface by means of a vacuum holding assembly generally designated as 36. This vacuum holding assembly 36 is selectively operable to produce a suction force capable of releasably and securely retaining the tool on the headlamp in the predetermined orientation. As illustrated, the vacuum holding assembly 36 may be comprised of a vacuum cup 38 secured to and forming a portion of a piston assembly 40. The piston assembly 40 is telescopingly mounted in a cylinder 42 defined centrally of the vacuum holding assembly 36.

A passageway 44 extends through the piston assembly 40 including the vacuum cup 38. This passageway 44 provides communication between the concave side of the vacuum cup and the portion 45 of the cylinder 42 remote from the metal inserts 32. This portion 45 of the cylinder 42 is hereinafter referred to as the vacuum chamber portion.

Suction producing means is provided to create a reduced pressure in the vacuum chamber portion 45 of the cylinder 42. In the illustrated embodiment this suction producing means takes the form of a venturi assembly 46 communicating with a suitable source of pressurized air through suitable conduit means schematically shown as broken away at 47 in FIG. 6.

Air passing through the venturi assembly 46 creates a low pressure zone communicating with the vacuum chamber portion 45 of the cylinder 42 in a manner hereinafter more fully described. Through the creation of this low pressure zone, air is withdrawn from that vacuum chamber and is carried with the air forced through the venturi assembly 46 to a suitable location. In a manner hereinafter more fully elaborated upon, the resultant low pressure produced in the cylinder 42 is operative to create a suction force capable of securely and releasably retaining the tool on the headlamp when properly oriented.

In instances of improper orientation of the tool 10, a sensing means generally designated at 48 is operable to prevent this suction force from reaching a magnitude sufficient to securely retain the tool on the headlamp. The sensing means 48 is cooperable with the vehicle headlamp 12 for sensing the orientation of the tool with respect to the headlamp. In response to sensed orientations other than the predetermined correct orientation of the tool, the sensing means 48 prevents the suction force from reaching the secure tool retention magnitude.

As illustrated, the sensing means includes a sensing ring 50 movably carried on the tool 10. When the tool 10 is properly oriented, as shown in FIG. 1, the sensing ring 50 occupies an extended position surrounding the aiming pads 22. In instances of improper orientation, the sensing ring 50 cooperates with the headlamp, usually by engagement with the aiming pads 22, and is urged away from the illustrated extended position. Movement of the sensing ring 50 is operative to produce movement of push rods or sensing rods 52 carried by the vacuum holding assembly 36, in a manner subsequently described.

The push rods 52 in turn are operable to flex a valve spring 54 at the rear of the vacuum holding assembly 36. Resulting movement of this valve spring 54 produces fluid communication between the vacuum chamber portion 45 of the cylinder 42 and a suction reducing zone 56 normally isolated from the suction force creating means and from the cylinder vacuum chamber 45. In the illustrated embodiment, this suction reducing zone 56 is defined at the interior of the tool body assembly 24 directly to the rear of the vacuum holding assembly 36.

As described hereinafter, when the sensing ring 50 detects improper orientation of the tool 10, air is permitted to pass from the suction reducing zone 56 of the tool to the vacuum chamber portion 45 of the cylinder 42. This flow of air, which may be conveniently termed suction venting, prevents the air flowing through the venturi assembly 46 from creating a suction in the cylinder 42 of a magnitude sufficient to securely maintain the tool in position on the headlamp. It will, however, be appreciated that even when communication with the suction reducing zone 56 is established, a degree of suction is created in the cylinder 42 in a magnitude sufficient to produce partial and movable support of the tool 10 on the headlamp.

The absence of complete support functions to signal the operator that the tool is improperly positioned by reason of the sensed presence of the weight of the tool 10 in the hands of the operator. However, the partial support is advantageously sufficient to enable the operator to easily slide the tool across the headlamp 12 with the vacuum cup 38 in engagement with the lens 16. Thereafter, when the tool 10 is properly oriented, the valve spring 54, which is normally biased to a closed position, is able to return to that closed position since the sensing ring no longer exerts any force against the push rods 52.

Removal of the tool 10 from the headlamp 12 may be readily accomplished according to the present invention in conjunction with the venturi assembly 46. With reference to FIG. 6, it may be seen that a valve 58 is provided on the body assembly 24. This valve 58 communicates with the venturi assembly 46 through a suitable conduit means schematically shown at 60 in broken-away fashion. In a manner hereinafter more fully described, the valve 58 normally permits air to pass completely through the venturi assembly 46. However, the valve may be manually operated to block the exit of air forced into the venturi assembly 46 through the air source conduit means 47.

Thus, instead of creating a reduced pressure in the cylinder vacuum chamber 45, the source air is operative to increase the pressure therein. As a result, the pressure is also increased in the passageway 44 connecting the cylinder vacuum chamber 45 and the concave portion of the vacuum cup 38. This increased pressure positively forces the cup 38 and the tool 10 away from the headlamp.

Detailed Structure

With particular reference to FIGS. 2 through 6 and with continued reference to FIG. 1, the preferred configuration of certain of the above described elements may be understood.

From the exploded assembly view of FIG. 2, it will be seen that the previously identified adapter 34 may be comprised of a generally annular member having a forward planar surface 60 in the shape of a ring. Securely fastened to the forward surface 60 of the adapter body 34 are the previously identified metal inserts 32.

The inserts are generally arcuate in nature with an arcuate extent of about 60°, and each insert presents one of the earlier noted flat surfaces 35 which together define the seating surface of the tool 10. With this arrangement, the flat surfaces 35 may all be machined together after mounting on the adapter member 34 in order to insure that they are coplanar. The inserts 32, like the aiming pads of the headlamp are circumferentially spaced from one another by about 60°.

To facilitate positive and direct coupling of the adapter body 34 to the vacuum holding assembly 36 as noted hereinafter, a plurality of coupling apertures 62 are provided in the adapter. These apertures are circumferentially spaced by about 60° and extend from the forward surface 60 of the adapter body 34 through an axially extending outer circumferential ring portion 64 of the adapter body. The adapter body 34 is also provided with an inner axially extending, circumferential ring portion 66. This inner ring portion 66 extends axially rearward of the front surface 60 of the adapter to a greater extent than that of the outer ring portion 64.

From FIG. 5 it may be seen that a plurality of circumferentially spaced, and radially extending, connecting lugs 68 may connect the inner and outer ring portions 66 and 64 of the adapter body 34. Several of these lugs 68 may be apertured to receive suitable securing means, such as the screws indicated at 70, for maintaining the inserts in position on the front surface of the adapter. Others of these lugs 68 may be apertured with extensions of the earlier noted connecting apertures 62, to provide means for receiving suitable fastening members 72. These fastening members are operable to secure the adapter body 34 to the vacuum holding assembly 36.

This securing is accomplished through connecting the adapter body 36 to a carrier body or head member 74 of the vacuum holding assembly 36 (See FIG. 2). This head member 74 has a generally cylindrical configuration and is comprised of an outer annular ring portion 76 and an inner annular ring portion 78 regularly spaced from the outer ring portion.

The forward end of the head member 74 is provided with a circumferentially extending, and radially outwardly projecting annular shoulder 80. The lugs 68 interconnecting the inner and outer ring portions 66 and 64 of the adapter body 34 may firmly abut against this shoulder 80 when the adapter body is assembled.

Assembly is further facilitated insofar as the outer diameter of the inner ring portions 66 of the adapter member 34 is slightly less than the inner diameter of the outer ring portion 76 of the head 74. Thus, the inner ring of the adapter member may be telescoped into the head member with the two members approximately axially-aligned.

A body ring 82 having an inner diameter substantially equal to the outer diameter of the head member is provided to mount the head member 74 of the vacuum holding assembly 36 on the tool body assembly 24. This body ring 82 includes a forward outer circumferential flange 84. The flange 84 telescopes over the outer shoulder 80 of the head member 74 through the provision of an annular recess, indicated at 86. The outer flange 84 presents a forward face 88 that abuts, in assembly, the inner face 90 of the outer annular member 64 of the adapter 34.

Threaded apertures 92 are provided in the body ring in circumferentially spaced locations. These locations correspond to those of the connecting apertures 62 extending through the outer annular member 64 of the adapter body. In assembly, the apertures 92 and 62 of the body ring and the adapter member are aligned, and suitable threaded fasteners 72 (FIG. 5) are operable to draw the body ring and the adapter member into abutting relationship.

Since the annular shoulder 80 of the head member 74 is interposed between the body ring 82 and the adapter member 34, an integral assembly is thus formed of the head member, the adapter member and the body ring. As best viewed in FIG. 1, a threaded outer periphery 94 of the body ring 82 is employed to mount this integral assembly to the internal periphery of the body assembly 24. In the assembled position of FIG. 1, the outer flange 84 of the body ring abuts the front face of the body assembly.

Prior to the assembly of the body ring 82 and the adapter member 34 on the head member 74 as previously described, the sensing ring 50 is positioned.

As viewed in FIG. 2, the sensing ring 50 is comprised of a generally annular body portion 96 from which a plurality of lugs project radially inwardly. At least two of the lugs 98 are shown as being generally diametrically opposed. These lugs 98 serve to transmit force to the push rods 52 as hereinafter more fully described.

Additional positioning lugs 100 may also be provided. Such positioning lugs may serve to stabilize the movement of the sensing ring 50 and to properly orient the sensing ring with respect to the adapter 34. These positioning lugs 100 may be reduced in size as compared with the force transmitting lugs 98.

With continued reference to FIG. 2, it may be seen that the outer annular ring portion 64 of the adapter member 34 is slotted at circumferential positions corresponding to the circumferential positions of the lugs 98 and 100 on the sensing ring 50. Two slots 102 serve to receive the force transmitting lugs 100 and additional slots 104 serve to receive the additional lugs 100.

Upon assembly of the device these slots 102 and 104 project, in part, beyond the forward end of the body assembly 24 of the tool as may be seen in FIGS. 1 and 3. During operation of the device, the sensing ring 50 may move toward and away from the end of the body assembly with the lugs 98 and 100 travelling in the slots. It will be appreciated that this movement is facilitated since the inner periphery of the annular body portion 96 of the sensing ring 50 is telescopingly received over the outer annular ring portion 64 of the adapter member 34 with the lugs in position. Moreover, the axial extent of the lug receiving slots in the adapter ring is less than the axial extent or thickness of the lugs.

As will be noted, the radial projection of the force transmitting lugs 98 exceeds the radial spacing between the inner and outer rings 66 and 64 of the adapter member. Therefore, in the vicinity of the slots 102 for reception of the force transmitting lugs, the inner ring 66 is provided with generally radially inwardly extending projections 105. These projections 105 are grooved or U-shaped for reception of the innermost portions of the force transmitting lugs 98 and for reception of generally longitudinally extending tubular members 106 of the head member 74.

When the adapter member 34 is assembled on the head member 74, the projections 105 surround the two tubular members 106 which project radially inwardly of the outer ring 76 of the head member. The tubular projections 106 receive the sensing rods 52.

With the sensing ring in an assembled posture, the force transmitting lugs 98 are aligned with the sensing rods 52. In this assembled posture, the adapter member 34 and the head member 74 serve as retainers for the sensing ring 50.

The retained sensing ring 50 is normally biased to a forward position (FIGS. 1 and 5) through the engagement of one end of each the sensing rods 52 with the force transmitting lugs 98. As earlier noted, the sensing rods 52 are biased through the engagement of their other ends with the valve spring 54.

From FIGS. 1, 3 and 4 it may be seen that this valve spring 54 is mounted on a back plate 108 attached to the rear of the head member 74. This back plate 108 is provided with a central boss 110 extending partially across the plate in a generally diametrical direction. The boss 110 is generally tapered inwardly toward the plate on opposite sides of the central portion thereof. Through suitable fastening means, as indicated at 112, the valve spring 54 is attached to the boss while overlying the tapered portions. Thus, the ends of the valve spring 54 are supported in cantilever fashion.

The above arrangement is such that the ends of the valve spring 54 are biased so as to overlie apertured bosses 114 projecting from the back plate. The apertures 116 in the bosses 114 extend through the back plate 108 and communicate with the vacuum chamber portion 45 of the cylinder 42 as will be further described hereinafter. Surrounding the apertured bosses 114 externally of the back plate 108 are O-ring seals 118 which serve, together with the biased valve spring 54, to normally isolate the earlier mentioned suction reducing zone 56 surrounding the external portion of the back plate from the cylinder vacuum chamber portion 45.

Diametrically aligned with the apertured bosses but spaced radially outward therefrom are sensing rod receiving apertures 120 extending through the back plate 108. The overall extent of the sensing rods 52 is such that, with the device assembled and with the sensing ring 34 in its axially extended position, the outer end of each sensing rod engages one of the force transmitting lugs 98 of the sensing ring while the inner end engages the ends of the biased valve spring 54.

It will be appreciated that with the back plate 108 assembled, the rod receiving apertures 120 are aligned with the tubular rod receiving members 106. Moreover, it will be apparent that the valve spring 54 is provided with a sufficiently large biasing force to normally urge, by the transmission of force through the sensing rods 52, the sensing ring 34 to its axially outermost position.

The back plate 108 may be assembled on the head member 74 in any suitable manner. For example, a plurality of circumferentially spaced threaded fasteners 122 may extend through circumferentially spaced apertures in the back plate. These apertures are aligned with threaded apertures in an outer annular, and rearly projecting, rim 124 of the back plate. This rim 124 may also be provided with relatively short tubular bosses 126 which form extensions of the tubular push rod receiving member 106. The extension bosses 126 may be sized to snap-fit into the rod receiving passages 120 of the back plate 108 to further facilitate assembly.

The rear wall 128 of the head member 74 is in the form of an annular seating surface spaced axially inwardly of the outer rim 124 of the back plate. The back plate 108 is provided with a cooperating annular projecting seating surface 130. The outer diameter of that surface 130 is less than that of the shoulder, indicated at 132, created through the configuration of the axial offset of the outer rim 124 and rear wall 128 of the head member. A suitable O-ring 134 may be interposed between the annular seating surface 130 of the back plate and that shoulder 132 in order to further isolate the vacuum chamber portion 45 of the cylinder 42 from the suction reducing zone 56.

As best viewed in FIG. 6, additional bosses 137 may be provided on the rear seating surface 128 of the head member. This facilitates assembly of the back plate when it is provided with boss receiving apertures 137a. O-ring seals may be employed in this connection, and additional fasteners 122a (see FIG. 4) may be threaded into the bosses 137.

As will be apparent from FIGS. 3 and 5, an extension of the cylinder vacuum chamber portion 45 is defined by the portion of the back plate 108 spaced from the seating surface 128 of the head member by reason of the annular projection 130. This vacuum chamber is indicated generally at 136. It should be here noted that the vacuum chamber extension 136 communicates with the boss apertures 116 normally isolated from the suction reducing zone 56. Thus, when the bosses 114 are uncovered by the spring 54 upon sensing rod movement, the suction reducing zone 56 communicates with the vacuum chamber portion 45 of the cylinder 42.

Within the cylinder 42, the previously identified piston assembly 40 is slidably mounted. The piston assembly 40 is comprised of a generally stepped and hollow cylindrical piston body 138 having a stepped cross-sectional configuration internally and externally. The hollow internal stepped configuration defines a cup-like portion of the piston assembly. It is evident that this cup-like portion forms a portion of the vacuum chamber through continuous communication with the vacuum chamber portion 45 of the cylinder.

The axially forward wall 140 of the piston body is centrally apertured at 142 to receive a tubular connecting rod 144. One end of this connecting rod 144 is threaded at 146 and is secured to the piston body through one or more nuts 148.

In order to retain the vacuum cup 38 as an integral member of the piston assembly 40, the forward end of the connecting tube 144 is flanged at 148. A rear neck portion 150 of the vacuum cup 38 may also be suitably connected to a rigidifying body 152 for this purpose. The rigidifying body 152 forms a portion of the piston assembly 40 and may include, at one end, a cylindrical flange 154 on which the vacuum cup 38 is mounted.

The other end of the rigidifying body 152 may itself be mounted over and coupled to the stepped periphery of the main piston 138 as indicated at 156. A suitable O-ring seal 158 may be adjacently interposed on the stepped periphery of the main piston to seal the cylinder 42. As shown at 160 the forward cylinder wall projects radially inwardly to serve as a retainer for the piston assembly 40. The piston assembly 40 is thereby prevented from translating forward out of the cylinder 42.

The concave portion of the vacuum cup 38 may be provided with an annular, and generally rigid, support plate 162. This plate is formed with a central aperture 164 terminating in shouldered pocket 166. Retained in that pocket 166 is the flanged end 148 of the connecting rod 144. The end surfaces of the rod 144 and the support plate 162 may be substantially coplanar.

As may be seen in FIG. 1, in operation, the flexible concave surface periphery 168 of the resilient vacuum cup 38 engages the headlamp lens 16 to define a chamber 170 between the vacuum cup and the headlamp. The passageway 44 extending through the connecting rod 144 provides communication between that chamber 170 and vacuum chamber portion 45 of the cylinder 42. In this fashion, any low pressure created in that vacuum chamber cylinder portion 45 by the venturi assembly 46 is transmitted to the chamber 170 adjacent the headlamp lens 16.

The venturi assembly 46 which is operable to create such low pressure may be formed by a nozzle 172 and a jet assembly 174. As may be seen in FIG. 6, the jet assembly 174 is integrally molded with the back plate closure 108 of the head member 74. The nozzle 172 is molded with the rear seating surface 128 of the head member 74 and projects outwardly therefrom at 176. The nozzle projection 176 is telescopically received within the jet assembly 174 when the back plate 108 is in assembled position, to define an annular aspiration zone 178 therebetween.

On the forward side of the rear seating surface 128 of the head member 74, a closed chamber 108 is defined by an integrally molded projecting wall 182. The forward portion of the nozzle 172 projects into this chamber 180.

Also integrally molded with the rear seating surface 128 of the head member, and projecting forwardly into the chamber 180 as well as rearwardly beyond the seating surface, is a tubular member 184. This tubular member 184 defines an exhaust passage 186 of the venturi assembly 46. It will be appreciated that the backing plate 108 is formed with an aperture 188 that receives the outwardly projecting portion of the tubular member. An O-ring seal 190 may be provided in a recess to insure fluid tight assembly of the back plate at this location.

On the outer wall of the body assembly 24 a suitable fluid conduit fitting 192 may be supported in any suitable manner. The earlier noted connecting conduit 47 provides fluid communication between that fitting 192 and the jet assembly 174 of the venturi assembly 46. A suitable source of air under pressure indicated by the arrow 194, may be readily connected to the fitting 192 through any suitable means.

The previously mentioned conduit 60 is provided between the venturi exhaust passage 186 and the earlier noted valve means 58. Thus, air normally fed to the venturi assembly from the source 194 is exhausted through the valve means 58 along the flow path indicated by the arrows in FIG. 6.

The valve means 58 may comprise a valve stem 196 having a piston end 198. This piston end 198 projects into a tubular cylinder 200 mounted on the body assembly 24, as indicated at 202, and projecting internally of the tool 10. The other end of the valve stem 196 projects outwardly of the body assembly 24 and is comprised of a button type configuration 204. It may be here noted that the cylinder 200 is provided with exhaust ports 206 adjacent the piston end of the valve stem 196.

Operation

In operation air at a suitable regulated pressure (generally 45 pounds will be adequate) is supplied to the venturi assembly 46 from the source 194. This air flows into the chamber 180 at the exit end of the nozzle 172 and is exhausted through the tubular member 184 to the valve means 58. The air under pressure is sufficient to maintain the valve stem 196 in the raised position illustrated in FIG. 6 by acting against the stem piston 198. This results in the cylinder ports 206 being uncovered to provide an exit path, for the supplied air, to the tool interior. It will be appreciated that the tool may be suitably opened to the atmosphere so as to avoid interior pressure buildup.

An air jet supplied to the nozzle 172 by the jet assembly 174 creates a low pressure in the aspirating zone 176. Since the aspirating zone communicates with the vacuum chamber portion 45 of the cylinder 42 (by reason of communication with the vacuum chamber extension 136 defined by the space between the back plate 108 and the rear head member seating surface 128 as above discussed), air is withdrawn from that vacuum chamber portion 45.

It may be here noted a coil spring 208 in the cylinder 92 normally urges the piston assembly to an extended position shown in FIG. 3. This spring 208 acts between the forward wall 140 of the main piston 138 and the back plate 108. Spring retention may be provided by the connecting rod 144 and by a boss 210 projecting from the back plate, both of which are surrounded by the spring 208 when assembled.

In the absence of engagement of the vacuum cup 38 against the headlamp lens 16, the atmospheric pressure on opposite sides of the biased piston assembly 40 is substantially equal, so that the provided bias maintains the assembly extended. However, when an operator places the vacuum cup 38 against the headlamp lens 16, the outer peripheral portion 168 seals against the headlamp to define the chamber 170 therebetween (FIG. 1). The negative pressure created by the venturi draws air from the vacuum chamber in the above described fashion, as well as from the chamber 170 between the vacuum cup and the headlamp, by reason of the fluid passageway 44 connecting these two chambers.

Because of the reduced pressures thus created, the flexible vacuum cup 38 is pulled against the headlamp lens 16 and, at about the same time, the suction force (produced by the reduced pressure reacting on the rear of the piston assembly 40) overcomes the biasing force of the spring 208. This tends to retract the piston assembly 40 in the cylinder 42 so that the tool 10 is actually urged forward toward the headlamp 12 (See FIG. 1). It will be appreciated that the fluid reaction surface area of the vacuum cup 38 is greater than the fluid reaction surface area of the piston assembly 40 so that the vacuum cup may be held firmly against the headlamp face.

In instances wherein the tool 10 is improperly located on the headlamp, i.e., where the headlamp reference surface and the tool seating surface are not in properly oriented mating engagement, the biased sensing ring 50 cooperates with the headlamp to be urged toward the rear of the tool body. Such movement causes the force transmitting lugs 98 of the sensing ring 50 to move the sensing rods 52 against the valve spring 54. The cantilevered ends of the valve spring 54 are thereby flexed and the flexed ends of the valve spring 54 break the seal normally provided between the vacuum chambers and the suction reducing zone 56.

In this manner air is permitted to flow into the vacuum chambers from the suction reducing zone 56 to prevent the suction force from reaching a level as great as the minimum required to securely hold the tool on the headlamp. Additionally, the operator is immediately notified that the tool 10 is improperly located insofar as he may sense the weight of the tool. Advantageously the tool may be molded primarily of plastic so that the torque exerted by the tool on the lamp body is minimized, as is the amount of weight the operator is required to support.

The suction force created by the venturi assembly 46 remains, however, sufficient to partially support the tool 10 on the headlamp 12. This partial support advantageously permits the operator to readily slide the tool across the face of the lamp until the sensing ring 50 is properly positioned around the aiming pads 22 with the tool properly oriented. It will be appreciated that the mounting of the sensing ring 50 may be such as to permit a limited amount of pivoting about its axis as well as the translating sensing movement. The sensing ring 50 is advantageously constructed of plastic so as to minimize the possibility of breaking the glass aiming pads 22 and so as to enhance the wearability of the member.

As the biased valve spring 54 urges the sensing ring to its extended position, it again seals the vacuum chambers from the suction reducing zone 56. With all vacuum chambers thus sealed, the venturi assembly 40 is operative to create a negative pressure at a level (approximately 20 -inches of mercury in the case of the illustrated tool) causing the aimer to be firmly positioned and securely held on the headlamp with the aiming pad surfaces 20 in mating engagement with the seating surfaces 35 provided by the inserts 32.

Removal of the headlamp aimer is facilitated according to the present invention by depression of the valve button 204 of the valve assembly 58 (FIG. 6). This depression causes the piston member 198 of the valve stem 196 to block the venting ports 206 of the valve cylinder 200. Thus supplied air is prevented from exhausting through the valve 58.

The air supplied to the venturi assembly 46 from the source 194 is then forced into the vacuum chambers through the same flow path normally encountered during air withdrawal for suction purposes. This flow path, of course, includes the connecting passageway 44 to the chamber 170 defined between the vacuum cup 38 and the headlamp lens 16. With positive pressure air supplied to this chamber 170 and acting against the flexible vacuum cup 38, the tool 10 is literally blown from the headlamp. When the valve button 204 is released, the positive pressure again moves the valve stem 196 to its extended position. It will be appreciated that the communication of the vacuum chambers with the ports 116 covered by the valve spring 54 does not affect the ability to affect removal of the tool in the described fashion.

GENERAL SUMMARY OF ADVANTAGES AND SCOPE OF THE INVENTION

It will thus be seen that according to the present invention a novel apparatus for testing the alignment of vehicle headlamps is provided wherein correct orientation of the tool with respect to the headlamp is enhanced.

Of particular significance is the provision of sensing means cooperable with the vehicle headlamp for sensing the orientation of the tool so as to prevent a holding suction force from securely retaining the tool on the headlamp when improper orientation is sensed.

Also of importance is the fact that the vacuum holding means remains operable to produce a suction force capable of partially and movably supporting the tool on the headlamp. In this manner, operator notification of improper orientation is produced and instances of improper tool orientation may be readily corrected by sliding the tool across the headlamp.

The means whereby the tool may be positively forced from the headlamp is of independent significance by reason of its simplicity and insofar as it may decrease the time otherwise required for removal.

It will of course be appreciated that the suction holding force may be produced through arrangements other than the venturi assembly illustrated. For example, a conventional source of suction may be connected directly to the vacuum chambers or even to the venturi assembly. In these instances the exhaust port of the venturi assembly may be blocked.

Moreover, sensing means may be provided in direct communication with the source of positive fluid pressure or suction to prevent the holding force from retaining the tool securely in position when improper orientation is sensed.

Insofar as numerous other variations not specifically described will occur to those skilled in the art, it will be apparent that although the invention has been described with reference to a particular preferred embodiment, additions, substitutions, modifications and deletions not specifically mentioned may be made by those skilled in the art without departing from the spirit or scope of the invention as defined in the appended claims.

What is claimed is:

1. Apparatus for testing the alignment of vehicle headlamps provided with means defining an outwardly facing reference surface, the apparatus comprising:
    an elongate headlamp aiming tool including means, carried adjacent one end thereof, defining a seating surface for matingly abutting the reference surface of the vehicle headlamp with said tool positioned in a predetermined orientation with respect to the headlamp;
    vacuum holding means carried by said tool and selectively operable to produce a suction force capable of releasably and securely retaining said tool on the headlamp in said predetermined orientation; and
    sensing means, cooperable with the vehicle headlamp, for sensing the orientation of said tool with respect to the headlamp and for preventing said suction force from securely retaining said tool on the headlamp in response to sensed tool orientations other than said predetermined orientation in which said seating surface matingly abuts the reference surface.

2. The apparatus according to claim 1 including:
    tool releasing means operatively coupled to said vacuum holding means for selectively forcing said tool from the headlamp.

3. The apparatus according to claim 1 wherein:
    said vacuum holding means is operable to produce a suction force capable of partially and movably supporting said tool on the headlamp.

4. The apparatus according to claim 1 wherein: said vacuum holding means comprises:
    a flexible vacuum cup having a concave surface periphery for engaging the headlamp to define a chamber between said vacuum cup and the headlamp,
    wall means defining a passageway extending through said vacuum cup and communicating with said chamber, and
    suction producing means communicating with said passageway for reducing fluid pressure in said chamber; and wherein
    said sensing means comprises:
    movable tool orientation detecting means; and
    suction reducing means responsive to movement of said tool orientation detecting means for controlling the level of reduced pressure provided by said suction means.

5. The apparatus according to claim 4 wherein said vacuum holding means further comprises:
    a piston assembly operatively connected to said vacuum cup;
    a cylinder movably receiving said piston assembly and including a vacuum chamber portion communicating with said passageway;
    biasing means for urging said piston assembly and said vacuum cup to an extended position, and
    a venturi assembly communicating with said vacuum chamber portion of said cylinder and providing said suction producing means.

6. The apparatus according to claim 5 wherein said movable tool orientation detecting means comprises:
    a sensing ring carried by said tool adjacent said seating surface and projecting therebeyond, said sensing ring being positionable around the means defining an outwardly facing reference surface of the headlamp.

7. Apparatus for testing the alignment of vehicle headlamps provided with means defining an outwardly facing reference surface, the apparatus comprising:
    an elongate body assembly;
    an annular adapter member carried by said body assembly adjacent one end thereof and including means defining a seating surface for matingly abutting the reference surface of the vehicle headlamp with said body assembly positioned in a predetermined orientation with respect to the headlamp;
    sensing ring means movably supported on said body assembly and extending circumferentially about said seating surface, said sensing ring being positionable around the means defining the reference surface of the headlamp;
    a vacuum cup and piston assembly including a peripheral vacuum cup surface engageable with the headlamp to define a first chamber therebetween;
    a cylinder mounted centrally of said body assembly for telescopingly supporting said vacuum cup and piston assembly, said cylinder including a vacuum chamber portion communicating with said first chamber;
    biasing means for urging said vacuum cup and piston assembly to an extended position;
    a venturi assembly communicating with said vacuum chamber portion of said cylinder and operable, upon supply of positive pressure air from a source thereof, to create a low pressure zone for withdrawing air therefrom and from said first chamber;
    sensing valve means biased to a closed position for normally isolating said cylinder vacuum chamber portion from a suction reducing zone; and
    sensing rod means engageable with said sensing valve means and with at least a portion of said sensing ring means in force transmitting relationship;
    said sensing ring means being selectively cooperable with the vehicle headlamp to cause said sensing rod means to urge said sensing valve means to an open position providing communication between said suction reducing zone and said cylinder vacuum chamber portion through a suction venting flow path.

8. The apparatus according to claim 7 and including:
    venting valve means communicating with said venturi assembly for normally venting, in an open position, positive pressure air supplied thereto from a source thereof along with air withdrawn from said first chamber and from said cylinder vacuum chamber portion, said venting valve means being selectively closeable to provide for the supply of the positive pressure air through said venturi assembly and to said first chamber to force said tool from the headlamp.

9. The apparatus according to claim 7 wherein said annular adapter member includes:
a forward ring surface; and
arcuate inserts mounted on said forward ring surface in circumferentially spaced locations, said inserts each presenting a seating surface coplanar with one another and together providing said means defining a seating surface.

10. The apparatus according to claim 7 wherein said sensing ring means comprises:
a generally annular body portion from which a plurality of lugs project radially inwardly, at least two of said lugs providing said at least a portion of said sensing ring means engageable with said sensing rod means.

11. The apparatus according to claim 7 wherein:
said venturi assembly is operable to create a suction force capable of releasably and securely maintaining said tool on the headlamp in said predetermined orientation, and capable of partially and movably supporting said tool on said headlamp upon movement of said sensing valve means to an open position.

12. An apparatus supportable on a member in a predetermined orientation with respect thereto, the apparatus comprising:
a body assembly including means defining a seating surface for matingly abutting a reference surface of the member with the apparatus in a predetermined orientation relative to the member;
vacuum holding means selectively operable to produce a suction force capable of releasably and securely maintaining the apparatus and the member in positive engaged relationship in said predetermined orientation; and
sensing means, cooperable with the member for sensing the relative orientation of the body assembly with respect to the member and for preventing said suction force from reaching a magnitude sufficient to maintain the apparatus and the member in positive engaged relationship in response to sensed orientations other than said predetermined orientation.

13. The apparatus of claim 12 wherein said sensing means comprises:
movable orientation detecting means; and
suction reducing means responsive to movement of said orientation detecting means for controlling the level of suction provided by said vacuum holding means.

14. Apparatus for testing the alignment of vehicle headlamps provided with means defining an outwardly facing reference surface, the apparatus being mountable in an elongate headlamp aiming tool and comprising:
a head member;
means for securing the head member in said tool generally centrally thereof;
means, carried by said head member adjacent one end thereof, defining a seating surface for matingly abutting the reference surface of the vehicle headlamp with the tool positioned in a predetermined orientation with respect to the headlamp;
vacuum holding means carried by said head member and selectively operable to produce a suction force capable of releasably and securely retaining the tool on the headlamp in said predetermined orientation; and
sensing means, carried by said head member and cooperable with the vehicle headlamp, for sensing the orientation of the tool with respect to the headlamp and for preventing said suction force from securely retaining said tool on the headlamp in response to sensed tool orientations other than said predetermined orientation in which said seating surface matingly abuts the reference surface.

15. The apparatus according to claim 14 including:
tool releasing means operatively coupled to said vacuum holding means for selectively forcing said tool from the headlamp.

16. The apparatus according to claim 14 wherein:
said vacuum holding means is operable to produce a suction force capable partially and movably supporting said tool on the headlamp.

17. The apparatus according to claim 14 wherein said sensing means comprises:
movable orientation detecting means; and
suction reducing means responsive to movement of said orientation detecting means for controlling the level of suction provided by said vacuum holding means.

18. Apparatus for testing the alignment of vehicle headlamps, each provided with means defining an outwardly facing reference surface, the apparatus comprising:
frame means including means, carried adjacent one end thereof, defining a seating surface for matingly abutting the reference surface of the vehicle headlamp;
vacuum holding means carried by said frame means and selectively operable to releasably retain said frame means on a vehicle headlamp with a suction force; and
sensing means for sensing the misalignment of said seating surface with the reference surface; and
suction venting means responsive to said sensing means for reducing said suction force.

19. The apparatus of claim 18 wherein:
said vacuum holding means comprises:
a vacuum cup with a concave surface periphery for abutting a vehicle headlamp,
a cylinder,
a piston within said cylinder and connected to said vacuum cup,
means for creating a low pressure zone in said cylinder on one side of said piston,
a hollow passageway communicating with the concave side of said vacuum cup and with said cylinder on said low pressure side of said piston, and
means for biasing said piston toward an extended position in said cylinder;
said suction venting means including valve means connected to said cylinder for selectively venting the low pressure zone of said cylinder to the surrounding atmosphere; and
said sensing means comprising a sensing ring encompassing and extending forward of said seating surface, said sensing ring being operative to open said valve means when said seating surface is improperly aligned with the reference surface.

20. The apparatus according to claim 19 wherein said sensing means further comprises:
sensing rod means engageable with said sensing ring and said valve means in force transmitting relationship.

* * * * *